(12) United States Patent
Gao et al.

(10) Patent No.: US 12,355,104 B2
(45) Date of Patent: Jul. 8, 2025

(54) MULTIFUNCTIONAL ELECTRODE SEPARATOR ASSEMBLIES WITH BUILT-IN REFERENCE ELECTRODES AND THERMAL ENHANCEMENTS

(71) Applicant: GM GLOBAL TECHNOLOGY OPERATIONS LLC, Detroit, MI (US)

(72) Inventors: Jing Gao, Rochester, MI (US); Brian J. Koch, Berkley, MI (US); Xingcheng Xiao, Troy, MI (US); Mark W. Verbrugge, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 621 days.

(21) Appl. No.: 17/689,220

(22) Filed: Mar. 8, 2022

(65) Prior Publication Data

US 2023/0291077 A1    Sep. 14, 2023

(51) Int. Cl.
*H01M 50/46* (2021.01)
*B60K 1/04* (2019.01)
(Continued)

(52) U.S. Cl.
CPC .............. *H01M 50/46* (2021.01); *B60K 1/04* (2013.01); *H01M 10/0525* (2013.01);
(Continued)

(58) Field of Classification Search
None
See application file for complete search history.

(56) References Cited

U.S. PATENT DOCUMENTS 6,275,004 B1   8/2001  Tamai et al.
7,507,498 B2   3/2009  Yoon et al.
(Continued)

OTHER PUBLICATIONS

Chu et al. ("Testing Lithium-Ion Battery with the Internal Reference Electrode: An Insight into the Blocking Effect", J. Electrochem. Soc. 165(14), A3240, Oct. 17, 2018) (Year: 2018).*

(Continued)

*Primary Examiner* — Niki Bakhtiari
*Assistant Examiner* — James A Corno
(74) *Attorney, Agent, or Firm* — Quinn IP Law

(57) ABSTRACT

Presented are electrochemical devices with in-stack reference electrodes, methods for making/using such devices, and battery cells with stacked electrodes segregated by electrode separator assemblies including thermal barriers and built-in reference electrodes. An electrochemical device, such as a lithium-class secondary battery cell, includes an insulated and sealed housing with an ion-conducting electrolyte located inside the housing. A stack of working electrodes is also located inside the device housing, in electrochemical contact with the electrolyte. At least one electrode separator assembly is located inside the device housing, interposed between a neighboring pair of (anode and cathode) working electrodes. The electrode separator assembly includes a separator layer fabricated with an electrically insulating material that is sufficiently porous to transmit therethrough the ions of the electrolyte. An electrically conductive current collector (CC) layer, a thermally insulating thermal barrier (TB) layer, and an active electrode reference electrode (RE) layer are attached to the separator layer.

20 Claims, 4 Drawing Sheets

(51) Int. Cl.
*H01M 10/0525* (2010.01)
*H01M 10/48* (2006.01)
*H01M 50/414* (2021.01)
*H01M 50/417* (2021.01)
*H01M 50/431* (2021.01)
*H01M 50/434* (2021.01)
*H01M 50/437* (2021.01)
*H01M 50/449* (2021.01)
*H01M 50/451* (2021.01)
*H01M 50/457* (2021.01)
*H01M 50/489* (2021.01)
*H01M 50/491* (2021.01)

(52) U.S. Cl.
CPC ......... *H01M 10/48* (2013.01); *H01M 50/414* (2021.01); *H01M 50/417* (2021.01); *H01M 50/431* (2021.01); *H01M 50/434* (2021.01); *H01M 50/437* (2021.01); *H01M 50/449* (2021.01); *H01M 50/451* (2021.01); *H01M 50/457* (2021.01); *H01M 50/489* (2021.01); *H01M 50/491* (2021.01); *H01M 2220/20* (2013.01)

(56) References Cited

U.S. PATENT DOCUMENTS

| | | |
|---|---|---|
| 7,851,085 B2 | 12/2010 | Obrovac et al. |
| 8,565,949 B2 | 10/2013 | Christman et al. |
| 8,586,222 B2 | 11/2013 | Timmons et al. |
| 9,028,565 B2 | 5/2015 | Huang |
| 9,142,830 B2 | 9/2015 | Xiao et al. |
| 9,142,980 B2 | 9/2015 | Lee |
| 9,281,514 B2 | 3/2016 | Rhodes et al. |
| 9,379,418 B2 | 6/2016 | Wang et al. |
| 9,660,462 B2 | 5/2017 | Jeon |
| 9,923,189 B2 | 3/2018 | Xiao |
| 10,062,898 B2 | 8/2018 | Xiao |
| 10,199,643 B2 | 2/2019 | Zhou et al. |
| 10,367,201 B2 | 7/2019 | Yang et al. |
| 10,388,959 B2 | 8/2019 | Dong et al. |
| 10,424,784 B2 | 9/2019 | Yang et al. |
| 10,435,773 B2 | 10/2019 | Liu et al. |
| 10,446,884 B2 | 10/2019 | Yang et al. |
| 10,511,049 B2 | 12/2019 | Yang et al. |
| 10,566,652 B2 | 2/2020 | Dai et al. |
| 10,573,879 B2 | 2/2020 | Yang et al. |
| 10,593,988 B2 | 3/2020 | Xiao et al. |
| 10,629,941 B2 | 4/2020 | Dai et al. |
| 10,637,048 B2 | 4/2020 | Qi et al. |
| 10,673,046 B2 | 6/2020 | Dadheech et al. |
| 2003/0151868 A1 | 8/2003 | Inae et al. |
| 2011/0215767 A1 | 9/2011 | Johnson et al. |
| 2011/0248675 A1 | 10/2011 | Shiu et al. |
| 2012/0206296 A1 | 8/2012 | Wan |
| 2013/0119935 A1 | 5/2013 | Sufrin-Disler et al. |
| 2014/0152232 A1 | 6/2014 | Johnson et al. |
| 2019/0280333 A1 | 9/2019 | Dahn et al. |
| 2019/0280334 A1 | 9/2019 | Dahn et al. |
| 2019/0312312 A1* | 10/2019 | Ensling ............ H01M 10/0525 |
| 2019/0393546 A1 | 12/2019 | Dahn et al. |
| 2021/0091369 A1 | 3/2021 | Dadheech et al. |
| 2021/0091424 A1 | 3/2021 | Gao et al. |
| 2021/0218006 A1 | 7/2021 | Gao et al. |
| 2021/0273229 A1 | 9/2021 | Wang et al. |

OTHER PUBLICATIONS

Ahn et al. ("Hybrid separator containing reactive, nanostructured alumina promoting in-situ gel electrolyte formation for lithium-ion batteries with good cycling stability and enhanced safety", J. Power Sources 472, 228519, Oct. 1, 2020). (Year: 2020).*

Handbook of Batteries, Linden et al., ed., ISBN 0-07-135978-8, p. 35.29, Aug. 30, 2001 (Year: 2001).*

Shi et al. ("Effect of a thin ceramic-coating layer on thermal and electrochemical properties of polyethylene separator for lithium-ion batteries", J. Power Sources 270, pp. 547-553, Dec. 15, 2014) (Year: 2014).*

* cited by examiner

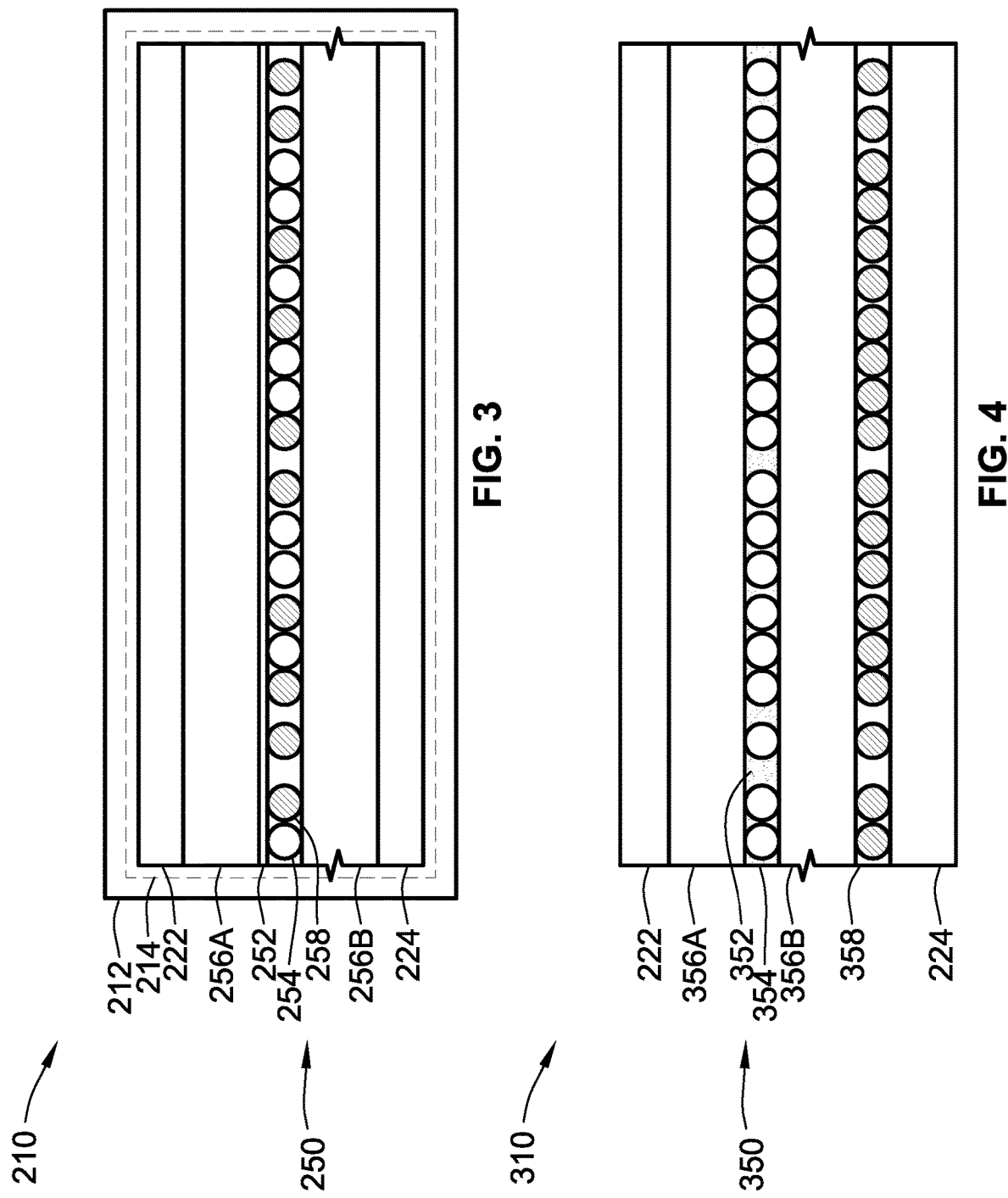

MULTIFUNCTIONAL ELECTRODE SEPARATOR ASSEMBLIES WITH BUILT-IN REFERENCE ELECTRODES AND THERMAL ENHANCEMENTS

INTRODUCTION

The present disclosure relates generally to electrochemical devices. More specifically, aspects of this disclosure relate to stacked electrode assemblies with in-stack reference electrodes for lithium-class battery cells.

Current production motor vehicles, such as the modern-day automobile, are originally equipped with a powertrain that operates to propel the vehicle and power the vehicle's onboard electronics. In automotive applications, for example, the vehicle powertrain is generally typified by a prime mover that delivers driving torque through an automatic or manually shifted power transmission to the vehicle's final drive system (e.g., differential, axle shafts, corner modules, road wheels, etc.). Automobiles have historically been powered by a reciprocating-piston type internal combustion engine (ICE) assembly due to its ready availability and relatively inexpensive cost, light weight, and overall efficiency. Such engines include compression-ignited (CI) diesel engines, spark-ignited (SI) gasoline engines, two, four, and six-stroke architectures, and rotary engines, as some non-limiting examples. Hybrid-electric and full-electric vehicles (collectively "electric-drive vehicles"), on the other hand, utilize alternative power sources to propel the vehicle and, thus, minimize or eliminate reliance on a fossil-fuel based engine for tractive power.

A full-electric vehicle (FEV)—colloquially labeled an "electric car"—is a type of electric-drive vehicle configuration that altogether omits an internal combustion engine and attendant peripheral components from the powertrain system, relying instead on a rechargeable energy storage system (RESS) and a traction motor for vehicle propulsion. The engine assembly, fuel supply system, and exhaust system of an ICE-based vehicle are replaced with a single or multiple traction motors, a traction battery pack, and battery cooling and charging hardware in a battery-based FEV. Hybrid-electric vehicle (HEV) powertrains, in contrast, employ multiple sources of tractive power to propel the vehicle, most commonly operating an internal combustion engine assembly in conjunction with a battery-powered or fuel-cell-powered traction motor. Since hybrid-type, electric-drive vehicles are able to derive their power from sources other than the engine, HEV engines may be turned off, in whole or in part, while the vehicle is propelled by the electric motor(s).

Many commercially available hybrid-electric and full-electric vehicles employ a rechargeable traction battery pack to store and supply the requisite power for operating the powertrain's traction motor unit(s). In order to generate tractive power with sufficient vehicle range and speed, a traction battery pack is significantly larger, more powerful, and higher in capacity (Amp-hr) than a standard 12-volt starting, lighting, and ignition (SLI) battery. Contemporary traction battery packs, for example, group stacks of battery cells (e.g., 8-16+ cells/stack) into individual battery modules (e.g., 10-40+ modules/pack) that are mounted onto the vehicle chassis by a battery pack housing or support tray. Stacked electrochemical battery cells may be connected in series or parallel through use of an electrical interconnect board (ICB) or front-end DC bus bar assembly. A dedicated Electronic Battery Control Module (EBCM), through collaborative operation with a Powertrain Control Module (PCM) and Traction Power Inverter Module (TPIM), regulates the opening and closing of battery pack contactors to govern operation of the battery pack.

There are four primary types of batteries that are used in electric-drive vehicles: lithium-class batteries, nickel-metal hydride batteries, ultracapacitor batteries, and lead-acid batteries. As per lithium-class designs, lithium-metal (primary) batteries and lithium-ion (secondary) batteries make up the bulk of commercial lithium battery (LiB) configurations, with lithium-ion (Li-ion) variants being employed in automotive applications due to their enhanced stability, energy density, and rechargeable capabilities. A standard Li-ion cell is generally composed to at least two conductive electrodes, an electrolyte material, and a permeable separator, all of which are enclosed inside an electrically insulated packaging. One electrode serves as a positive ("cathode") electrode and the other electrode serves as a negative ("anode") electrode during cell discharge. Rechargeable Li-ion batteries operate by reversibly passing lithium ions back and forth between these working electrodes. The separator—oftentimes a microporous polymeric membrane—is disposed between the two electrodes to prevent electrical short circuits while also allowing the transport of ionic charge carriers. The electrolyte is suitable for conducting lithium ions and may be in solid form (e.g., solid state diffusion), liquid form (e.g., liquid phase diffusion), or quasi-solid form (e.g., solid electrolyte entrained within a liquid carrier). Ions move from the negative electrode, through a connected circuit, to the positive electrode during discharge of the battery while under load, and in the opposite direction when recharging the battery.

SUMMARY

Presented herein are electrochemical devices with in-stack reference electrodes and thermal enhancements, methods for manufacturing and methods for operating such devices, and lithium-class battery cells with stacked working electrodes segregated by electrode separator assemblies having thermal barriers and built-in reference electrodes. By way of example, a pouch-type lithium-ion battery cell contains an electrode stack with a succession of anode electrodes interleaved with a like number of cathode electrodes. An electrically insulating and ionically conductive separator, which may be in the nature of a polymeric separator sheet immersed in liquid electrolyte or bonded to solid electrolyte, is disposed between each pair of neighboring electrodes. One or more of these electrode pairs incorporate a functional separator assembly with a conductive current collector (CC) layer, a reference electrode (RE) layer, and a thermal barrier (TB) layer all buttressed on a porous separator. An additional porous separator layer may be incorporated into the functional separator assembly to physically isolate the CC layer from a neighboring electrode. Like the separator sheets, the layers of the functional separator assembly are sufficiently porous to allow for the transfer therethrough of Li ions. The RE and TB layers may both be mounted to one side of the porous separator or, alternatively, may each be mounted to a respective side of the separator. Optionally, the RE and TB layers may directly contact the porous separator, e.g., with the CC layer applied over the RE and TB layers. Moreover, the RE and TB layers may be combined into a single intermixed layer or may be applied as distinct layers. The assembly layers may also be applied in a predefined pattern with each layer isolated to select regions on the separator substrate.

Attendant benefits for at least some of the disclosed concepts include functional separator assemblies that enable in-stack measurement of electrode electrical characteristics while ensuring electrical and thermal separation of neighboring working electrodes. By measuring electrode electrical characteristics using in-stack reference electrodes, disclosed concept helps to detect battery failure and control battery operation in an optimized manner. Disclosed separator assembly features also help to enhance cell life by improving thermal and mechanical stability. In addition to improved battery cell monitoring and operation, disclosed concepts may help to increase driving range, fuel economy, and pack performance for electric-drive vehicles.

Aspects of this disclosure are directed to electrochemical devices, such as cylindrical, pouch, and prismatic LiB cells that are used, for instance, in the battery modules of vehicular traction battery packs. In an example, an electrochemical device is constructed with a protective device housing for storing therein an electrolyte composition that is chemically configured to conduct ions. An electrode stack, which is located inside the device housing in electrochemical contact with the electrolyte, includes one or more first (e.g., anode) working electrodes interleaved with one or more second (e.g., cathode) working electrodes. At least one electrode separator assembly is also located inside the device housing, each of which is interposed between and physically separates a neighboring pair of the working electrodes. The electrode separator assembly is generally composed of a separator layer that is fabricated, in whole or in part, from an electrically insulating material with sufficient porosity to transmit therethrough the electrolyte ions. A current collector layer, a reference electrode layer, and a thermal barrier layer are all attached to the separator layer. The CC layer is fabricated, in whole or in part, from an electrically conductive material, whereas the RE layer is fabricated, in whole or in part, from an active electrode material and the TB layer is fabricated, in whole or in part, from a thermally insulating material.

Additional aspects of this disclosure are directed to lithium-class battery cells with stacked electrode assemblies having in-stack sensing capabilities, rechargeable battery packs employing such lithium-class battery cells, and motor vehicles equipped with such battery packs. As used herein, the terms "vehicle" and "motor vehicle" may be used interchangeably and synonymously to include any relevant vehicle platform, such as passenger vehicles (ICE, HEV, FEV, fuel cell, fully and partially autonomous, etc.), commercial vehicles, industrial vehicles, tracked vehicles, off-road and all-terrain vehicles (ATV), motorcycles, farm equipment, e-bikes, e-scooters, watercraft, aircraft, etc. For non-automotive applications, disclosed concepts may be implemented for any logically relevant use, including stand-alone power stations and portable power packs, photovoltaic systems, handheld electronic devices, pumping equipment, machine tools, appliances, etc. While not per se limited, disclosed concepts may be particularly advantageous for use in lithium-metal cylindrical, pouch, and prismatic can cells.

In an example, a motor vehicle includes a vehicle body with a passenger compartment, multiple drive wheels rotatably mounted to the vehicle body (e.g., via corner modules coupled to a unibody or body-on-frame chassis), and other standard original equipment. For electric-drive vehicle applications, one or more electric traction motors operate alone (e.g., for FEV powertrains) or in conjunction with an internal combustion engine assembly (e.g., for HEV powertrains) to selectively drive one or more of the road wheels to propel the vehicle. A rechargeable traction battery pack is mounted onto the vehicle body and operable to power the traction motor(s).

Continuing with the discussion of the preceding example, the traction battery pack contains multiple lithium-class battery cells, e.g., stacked within one or more battery modules. Each battery cell is fabricated with a protective battery housing that stores therein a liquid, solid, or quasi-solid electrolyte composition for conducting ions. An electrode stack is located inside the battery housing in electrochemical contact with the electrolyte. The electrode stack includes a series of first (anode) working electrodes that is interleaved with a corresponding number of second (cathode) working electrodes. Also located inside the battery housing is an electrode separator assembly that is interposed between a respective pair of the working electrodes. The electrode separator assembly includes one or more electrically conductive CC layers, one or more active electrode RE layers, and one or more thermally insulating TB layers, all of which are attached to one or more electrically insulating separator layers. Each layer of the separator assembly may be sufficiently porous so as to transmit therethrough the ions of the electrolyte.

Aspects of this disclosure are also directed to manufacturing processes, control logic, and computer-readable media (CRM) for making and/or using any of the disclosed electrochemical devices, battery packs, and/or vehicles. In an example, a method is presented for assembling an electrochemical device. This representative method includes, in any order and in any combination with any of the above and below disclosed options and features: receiving a device housing of the electrochemical device; locating an electrolyte inside the device housing, the electrolyte being configured to conduct ions; locating an electrode stack inside the device housing in electrochemical contact with the electrolyte, the electrode stack including first and second working electrodes; locating an electrode separator assembly inside the device housing and between the first and second working electrodes, the electrode separator assembly including: a separator layer including an electrically insulating material and having a porous structure that transmits therethrough the ions of the electrolyte; a current collector (CC) layer attached to the separator layer and including an electrically conductive material; a reference electrode (RE) layer attached to the separator layer, abutting the CC layer, and including an active electrode material; and a thermal barrier (TB) layer attached to the separator layer and including a thermally insulating material.

For any of the disclosed vehicles, methods, and devices, the CC layer, the RE layer, and the TB layer are porous structures that transmit therethrough the ions of the electrolyte. In this regard, the separator layer, CC layer, RE layer, and TB layer may all share the same porosity or, alternatively, may each have a respective porosity that is distinct from the porosities of the other layers in the separator assembly. In some applications, the separator, CC, RE, and TB layers are each microporous structures with a porosity having a void fraction of about 30% to about 80%.

For any of the disclosed vehicles, methods, and devices, the separator layer's electrically insulating material may include polypropylene, polyethylene, polyvinylidene fluoride, polytetrafluoroethylene, polytriphenylamine, and/or a cellulose composite. Optionally, the separator layer may have a thickness (in the stacking direction) of about 5 micrometers (μm) to about 60 μm. As yet a further available feature, the CC layer's electrically conductive material may include copper, silver, nickel, aluminum, graphene, gold, carbon, and/or alloys or composites thereof. Optionally, the CC layer may have a thickness (in the stacking direction) of about 50 nanometers (nm) to about 500 nm.

For any of the disclosed vehicles, methods, and devices, the RE layer's active electrode material may include lithium iron phosphate ($LiFePO_4$), lithium titanate (LTO), other lithium transition metal oxides, etc. Optionally, the RE layer may have a thickness (in the stacking direction) of about 5 microns or less (e.g., a single layer of RE particles at about 10 nm to about 1 micron). As yet a further available feature, the TB layer's thermally insulating material may include aluminum oxide ($Al_2O_3$), silicon dioxide ($SiO_2$), lithiated zeolite, and/or aluminosilicate. Optionally, the TB layer may have a thickness (in the stacking direction) of about 3 microns or less (e.g., about 50 nm to about 150 nm).

For any of the disclosed vehicles, methods, and devices, the electrode separator assembly consists essentially of the separator layer, the CC layer, the RE layer, and the TB layer (e.g., does not include other layers or additions that materially change or undermine the functional characteristics of the separator assembly). The RE layer and the TB layer may adjoin and physically contact the separator layer. In this instance, the CC layer may be disposed over or may be intermixed with the RE layer.

The Summary is not intended to represent every embodiment or every aspect of the present disclosure. Rather, the foregoing summary merely provides an exemplification of some of the novel concepts and features set forth herein. The above features and advantages, and other features and attendant advantages of this disclosure, will be readily apparent from the following detailed description of illustrated examples and representative modes for carrying out the present disclosure when taken in connection with the accompanying drawings and the appended claims. Moreover, this disclosure expressly includes any and all combinations and subcombinations of the elements and features presented above and below.

BRIEF DESCRIPTION OF THE DRAWINGS

FIG. 3 is a schematic illustration of a representative battery electrode stack with a single-sided electrode separator assembly having a multifunctional reference electrode and thermal barrier layer located on one side of a porous separator substrate in accord with aspects of the disclosed concepts.

FIG. 4 is a schematic illustration of another representative battery electrode stack with a dual-sided electrode separator assembly having a reference electrode layer and a thermal barrier layer each located on an opposing side of a porous separator substrate in accord with aspects of the disclosed concepts.

Figure 1:
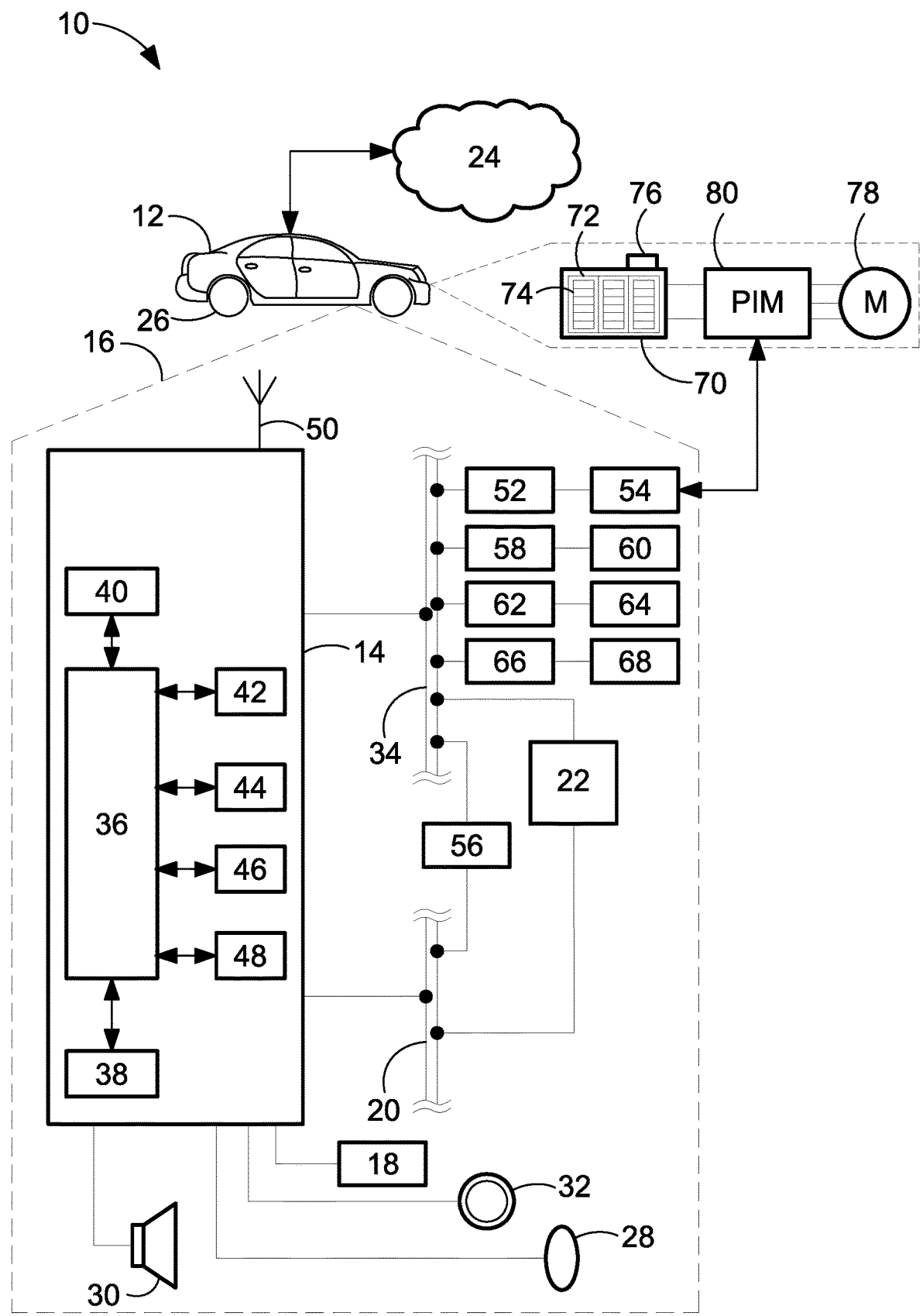
FIG. 1 is a partially schematic, side-view illustration of a representative motor vehicle propelled by an electrified powertrain equipped with a motor generator unit and a traction battery pack having enhanced thermal stability and in-stack electrode monitoring capabilities in accordance with aspects of the disclosed concepts.

The present disclosure is amenable to various modifications and alternative forms, and some representative embodiments are shown by way of example in the drawings and will be described in detail herein. It should be understood, however, that the novel aspects of this disclosure are not limited to the particular forms illustrated in the above-enumerated drawings. Rather, the disclosure is to cover all modifications, equivalents, combinations, subcombinations, permutations, groupings, and alternatives falling within the scope of this disclosure as encompassed, for example, by the appended claims.

DETAILED DESCRIPTION

This disclosure is susceptible of embodiment in many different forms. Representative embodiments of the disclosure are shown in the drawings and will herein be described in detail with the understanding that these embodiments are provided as an exemplification of the disclosed principles, not limitations of the broad aspects of the disclosure. To that extent, elements and limitations that are described, for example, in the Abstract, Introduction, Summary, and Detailed Description sections, but not explicitly set forth in the claims, should not be incorporated into the claims, singly or collectively, by implication, inference or otherwise.

For purposes of the present detailed description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and the like, shall each mean "including without limitation." Moreover, words of approximation, such as "about," "almost," "substantially," "generally," "approximately," and the like, may each be used herein in the sense of "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle when the vehicle is operatively oriented on a horizontal driving surface.

Referring now to the drawings, wherein like reference numbers refer to like features throughout the several views, there is shown in FIG. 1 a representative motor vehicle, which is designated generally at 10 and portrayed herein for purposes of discussion as a sedan-style, electric-drive automobile. The illustrated automobile 10—also referred to herein as "motor vehicle" or "vehicle" for short—is merely an exemplary application with which novel aspects of this disclosure may be practiced. In the same vein, incorporation of the present concepts into an FEV powertrain should be appreciated as a non-limiting implementation of disclosed features. As such, it will be understood that aspects and features of this disclosure may be applied to other powertrain architectures, incorporated into any logically relevant type of motor vehicle, and utilized for both automotive and non-automotive applications alike. Moreover, only select components of the motor vehicles and electrochemical devices are shown and described in additional detail herein. Nevertheless, the vehicles and devices discussed below may include numerous additional and alternative features, and other available peripheral components, for carrying out the various methods and functions of this disclosure.

The representative vehicle 10 of FIG. 1 is originally equipped with a vehicle telecommunications and information ("telematics") unit 14 that wirelessly communicates, e.g., via cell towers, base stations, mobile switching centers, satellite service, etc., with a remotely located or "off-board" cloud computing host service 24 (e.g., ONSTAR®). Some of the other vehicle hardware components 16 shown generally in FIG. 1 include, as non-limiting examples, an electronic video display device 18, a microphone 28, audio speakers 30, and assorted user input controls 32 (e.g., buttons, knobs, pedals, switches, touchpads, joysticks, touchscreens, etc.). These hardware components 16 function, in part, as a human/machine interface (HMI) that enables a user to communicate with the telematics unit 14 and other components resident to and remote from the vehicle 10. Microphone 28, for instance, provides occupants with means to input verbal or other auditory commands; the vehicle 10 may be equipped with an embedded voice-processing unit utilizing audio filtering, editing, and analysis modules. Conversely, the speakers 30 provide audible output to a vehicle occupant and may be either a stand-alone speaker dedicated for use with the telematics unit 14 or may be part of an audio system 22. The audio system 22 is operatively connected to a network connection interface 34 and an audio bus 20 to receive analog information, rendering it as sound, via one or more speaker components.

Communicatively coupled to the telematics unit 14 is a network connection interface 34, suitable examples of which include twisted pair/fiber optic Ethernet switches, parallel/serial communications buses, local area network (LAN) interfaces, controller area network (CAN) interfaces, and the like. Other appropriate communication interfaces may include those that conform with ISO, SAE, and/or IEEE standards and specifications. The network connection interface 34 enables vehicle hardware 16 to send and receive signals with one another and with various systems and subsystems both onboard and off-board the vehicle body 12. This allows the vehicle 10 to perform assorted vehicle functions, such as modulating powertrain output, governing operation of a vehicle transmission, activating friction and regenerative brake systems, controlling vehicle steering, regulating charge and discharge of a vehicle battery pack, and other automated functions. For instance, telematics unit 14 may receive and transmit signals to/from a Powertrain Control Module (PCM) 52, an Advanced Driver Assistance System (ADAS) module 54, an Electronic Battery Control Module (EBCM) 56, a Steering Control Module (SCM) 58, a Brake System Control Module (BSCM) 60, and assorted other vehicle ECUs, such as a transmission control module (TCM), engine control module (ECM), Sensor System Interface Module (SSIM), etc.

With continuing reference to FIG. 1, telematics unit 14 is an onboard computing device that provides a mixture of services, both individually and through its communication with other networked devices. This telematics unit 14 is generally composed of one or more processors 40, each of which may be embodied as a discrete microprocessor, an application specific integrated circuit (ASIC), or a dedicated control module. Vehicle 10 may offer centralized vehicle control via a central processing unit (CPU) 36 that is operatively coupled to a real-time clock (RTC) 42 and one or more electronic memory devices 38, each of which may take on the form of a CD-ROM, magnetic disk, IC device, a solid-state drive (SSD) memory, a hard-disk drive (HDD) memory, flash memory, semiconductor memory (e.g., various types of RAM or ROM), etc.

Long-range vehicle communication capabilities with remote, off-board devices may be provided via one or more or all of a cellular chipset/component, a navigation and location chipset/component (e.g., global positioning system (GPS) transceiver), or a wireless modem, all of which are collectively represented at 44. Close-range wireless connectivity may be provided via a short-range wireless communication device 46 (e.g., a BLUETOOTH® unit or near field communications (NFC) transceiver), a dedicated short-range communications (DSRC) component 48, and/or a dual antenna 50. It should be understood that the vehicle 10 may be implemented without one or more of the above listed components or, optionally, may include additional components and functionality as desired for a particular end use. The communications devices described above may provision data exchanges as part of a periodic broadcast in a vehicle-to-vehicle (V2V) communication system or a vehicle-to-everything (V2X) communication system, e.g., Vehicle-to-Infrastructure (V2I), Vehicle-to-Pedestrian (V2P), Vehicle-to-Device (V2D), etc.

CPU 36 receives sensor data from one or more sensing devices that use, for example, photo detection, radar, laser, ultrasonic, optical, infrared, or other suitable technology, including short range communications technologies (e.g., DSRC) or Ultra-Wide Band (UWB) radio technologies, e.g., for executing an automated vehicle operation or a vehicle navigation service. In accord with the illustrated example, the automobile 10 may be equipped with one or more digital cameras 62, one or more range sensors 64, one or more vehicle speed sensors 66, one or more vehicle dynamics sensors 68, and any requisite filtering, classification, fusion, and analysis hardware and software for processing raw sensor data. The type, placement, number, and interoperability of the distributed array of in-vehicle sensors may be adapted, singly or collectively, to a given vehicle platform for achieving a desired level of autonomous vehicle operation.

To propel the motor vehicle 10, an electrified powertrain is operable to generate and deliver tractive torque to one or more of the vehicle's drive wheels 26. The powertrain is generally represented in FIG. 1 by a rechargeable energy storage system (RESS), which may be in the nature of a chassis-mounted traction battery pack 70, that is operatively connected to an electric traction motor 78. The traction battery pack 70 is generally composed of one or more battery modules 72 each having a stack of battery cells 74, such as lithium ion, lithium polymer, or nickel metal hydride battery cells of the pouch, can, or prismatic type. One or more electric machines, such as traction motor/generator (M) units 78, draw electrical power from and, optionally, deliver electrical power to the battery pack 70. A power inverter module (PIM) 80 electrically connects the battery pack 70 to the motor/generator unit(s) 78 and modulates the transfer of electrical current therebetween. Disclosed concepts are similarly applicable to HEV and ICE-based powertrains.

The battery pack 70 may be configured such that module management, cell sensing, and module-to-module or module-to-host communication functionality is integrated directly into each battery module 72 and performed wirelessly via a wireless-enabled cell monitoring unit (CMU) 76. The CMU 76 may be a microcontroller-based, printed circuit board (PCB)-mounted sensor array. Each CMU 76 may have a GPS transceiver and RF capabilities and may be packaged on or in a battery module housing. The battery module cells 74, CMU 76, housing, coolant lines, busbars, etc., collectively define the cell module assembly.

Figure 2:
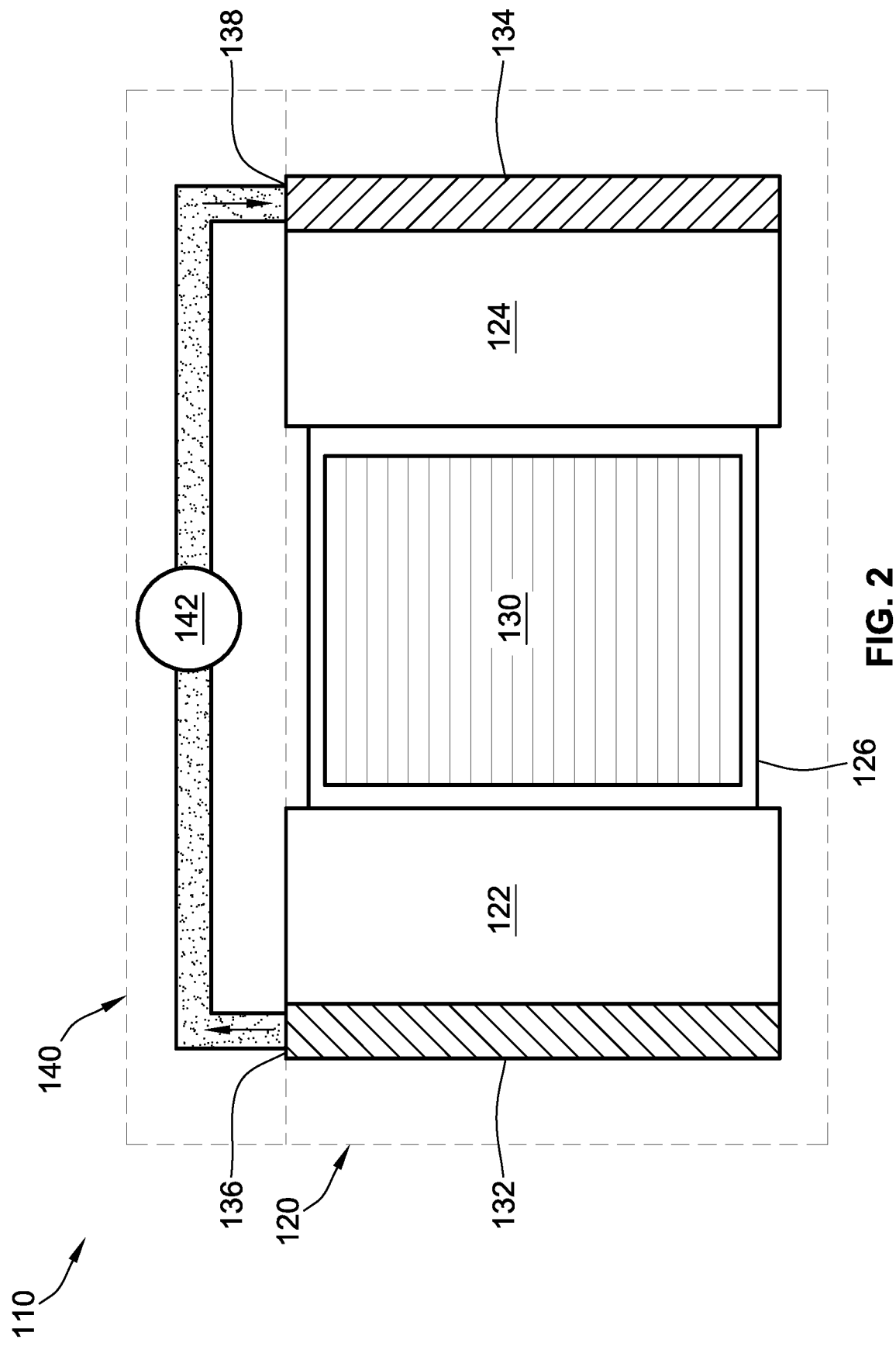
FIG. 2 is a schematic illustration of a representative electrochemical device with which aspects of the present disclosure may be practiced.

Presented in FIG. 2 is an exemplary electrochemical device in the form of a rechargeable lithium-class battery 110 that powers a desired electrical load, such as motor 78 of FIG. 1. Battery 110 includes a series of electrically conductive electrodes, namely a first (negative or anode) working electrode 122 and a second (positive or cathode) working electrode 124 that are stacked and packaged inside a protective outer housing 120. In at least some configurations, the battery housing 120 may be an envelope-like pouch that is formed of aluminum foil or other suitable sheet material. Both sides of a metallic pouch may be coated with a polymeric finish to insulate the metal from the internal cell elements and from adjacent cells. Alternatively, the battery housing (or "cell casing") 120 may take on cylindrical can constructions, i.e., for cylindrical battery cell configurations, or polyhedral box constructions, i.e., for prismatic battery cell configurations. Reference to either working electrode 122, 124 as an "anode" or "cathode" or, for that matter, as "positive" or "negative" does not limit the electrodes 122, 124 to a particular polarity as the system polarity may change depending on whether the battery 110 is being operated in a charge mode or a discharge mode. Although FIG. 2 illustrates a single battery cell unit inserted within the battery housing 120, it should be appreciated that the housing 120 may stow therein a stack of multiple cell units (e.g., five to five thousand cells or more).

Anode electrode 122 may be fabricated with an active anode electrode material that is capable of incorporating lithium ions during a battery charging operation and releasing lithium ions during a battery discharging operation. For at least some designs, the anode electrode 122 is manufactured, in whole or in part, from a lithium metal, such as lithium-aluminum (LiAl) alloy materials with an Li/Al atomic ratio in a range from 0 at. %≤Li/Al<70 at. %, and/or aluminum alloys with Al atomic ratio>50 at. % (e.g., lithium metal is smelt). Additional examples of suitable active anode electrode materials include carbonaceous materials (e.g., graphite, hard carbon, soft carbon etc.), silicon, silicon-carbon blended materials (silicon-graphite composite), $Li_4Ti_5O_{12}$, transition-metals (alloy types, e.g., Sn), metal oxide/sulfides (e.g., $SnO_2$, FeS and the like), etc.

With continuing reference to FIG. 2, cathode electrode 124 may be fabricated with an active cathode electrode material that is capable of supplying lithium ions during a battery charging operation and incorporating lithium ions during a battery discharging operation. The cathode 124 material may include, for instance, lithium transition metal oxide, phosphate (including olivines), or silicate, such as $LiMO_2$ (M=Co, Ni, Mn, or combinations thereof); $LiM_2O_4$ (M=Mn, Ti, or combinations thereof), $LiMPO_4$ (M=Fe, Mn, Co, or combinations thereof), and LiMxM'2-xO4 (M, M'=Mn or Ni). Additional non-limiting examples of suitable active cathode electrode materials include lithium nickel cobalt manganese oxide (NCM), lithium nickel cobalt aluminum oxide (NCA), lithium nickel cobalt manganese aluminum oxide (NCMA), and other lithium transition-metal oxides.

Disposed inside the battery housing 120 between each neighboring pair of electrodes 122, 124 is a porous separator 126 (FIG. 2) or an electrode separator assembly (FIGS. 3-6). The porous separator 126 may be in the nature of a microporous or nanoporous polymeric separator. Separator 126 may be a sheet-like structure that is composed of a porous polyolefin membrane, e.g., with a porosity of about 35% to about 65% and a thickness of approximately 10-30 microns. Electrically non-conductive ceramic particles (e.g., silica) may be coated onto the porous membrane surfaces of the separators 126. The porous separator 126 may incorporate a non-aqueous fluid electrolyte composition and/or solid electrolyte composition, collectively designated 130, which may also be present in the negative electrode 122 and the positive electrode 124. Separator 126 may include any of the features and options expounded below with respect to the separator layers of the herein described functional separator assemblies, and vice versa.

A negative electrode current collector 132 may be positioned on or near the negative electrode 122, and a positive electrode current collector 134 may be positioned on or near the positive electrode 124. The negative electrode current collector 132 and positive electrode current collector 134 respectively collect and move free electrons to and from an external circuit 140. An interruptible external circuit 140 with a load 142 connects to the negative electrode 122, through its respective current collector 132 and electrode tab 136, and to the positive electrode 124, through its respective current collector 134 and electrode tab 138.

The porous separator 126 may operate as both an electrical insulator and a mechanical support structure by being sandwiched between the two electrodes 122, 124 to prevent the electrodes from physically contacting each other and, thus, the occurrence of a short circuit. In addition to providing a physical barrier between the electrodes 122, 124, the separator 126 may provide a minimal resistance path for internal passage of lithium ions (and related anions) during cycling of the lithium ions to facilitate functioning of the battery 110. For some configurations, the porous separator 126 may be a microporous polymeric separator including a polyolefin. The polyolefin may be a homopolymer, which is derived from a single monomer constituent, or a heteropolymer, which is derived from more than one monomer constituent, and may be either linear or branched. In a solid-state battery, the role of the separator may be partially/fully provided by a solid electrolyte layer.

Operating as a rechargeable energy storage system, battery 110 generates electric current that is transmitted to one or more loads 142 operatively connected to the external circuit 140. While the load 142 may be any number of electric devices, a few non-limiting examples of power-consuming load devices include electric motors for hybrid and full-electric vehicles, laptop and tablet computers, cellular smartphones, cordless power tools and appliances, portable power stations, etc. The battery 110 may include a variety of other components that, while not depicted herein for simplicity and brevity, are nonetheless readily available. For instance, the battery 110 may include one or more gaskets, terminal caps, tabs, battery terminals, cooling hardware, charging hardware, and other commercially available components or materials that may be situated on or in the battery 110. Moreover, the size and shape and operating characteristics of the battery 110 may vary depending on the particular application for which it is designed.

In addition to the optional components identified in the preceding paragraphs, the battery 110 of FIG. 2 may also include one or more functional electrode separators with in-stack sensing capabilities and thermal enhancements for in situ electrode monitoring and improved thermal performance. A functional electrode separator assembly, for example, integrates a built-in reference electrode to measure real-time electrical characteristics of the adjoining working electrodes. The electrode separator assembly also integrates a thermal barrier, such as a ceramic coating, for enhanced thermal and mechanical stability. The reference electrode and thermal barrier may be combined into the separator assembly as a single-sided, double-layer coating in the order of: separator substrate—intermixed layer of active electrode material and thermal enhancement material—conductive current collector coating. This design helps to prevent unwanted material obstructing the ion-transmitting pores of the separator substrate and helps to improve the adhesion of RE and TB particles to the separator. Optionally, the reference electrode material, current collector material, and thermal enhancement material may be individually coated into a stack of distinct layers for a single-sided design. For a dual-sided, triple-layer architecture, the thermal enhancement layer may be coated on a side of the separator opposite that of the reference electrode and current collector layers. It may be generally desirable that all layers within the functional separator be porous and permeable to enable free ion transport.

For at least some embodiments, the active electrode material of the reference electrode layer may have a submicron thickness and may be used as a dual-function material to both measure electrode potential and to enhance the cell stack's thermal characteristics. During the coating process, the electrode active material and thermal barrier material may be applied first such that the RE and TB layers are mounted directly to the separator substrate; doing so helps to prevent the CC layer's conductive material from depositing into the pores of the separator. In other cases, a blending mixture, for example, of $LiFePO_4$ or LTO with submicron sized ceramic powders, such as $Al_2O_3$, $SiO_2$, lithiated zeolite, zeolite etc., may be coated onto a porous separator substrate to provide the functions noted above and, in addition, the oxides may be used as a high-frequency (HF) scavenger to improve the cycle stability of the battery cells.

Presented in FIGS. 3-6 are different examples of representative electrochemical devices 210, 310, 410 and 510, respectively, with a stacked pair of working electrodes 222 and 224 that are segregated by a functional electrode separator assembly 250, 350, 450 and 550 that provides built-in electrode monitoring and thermal enhancements. Similar to the electrochemical devices presented in FIGS. 1 and 2, the electrochemical devices 210, 310, 410, 510 of FIGS. 3-6 may be configured as a rechargeable lithium-class battery or battery pack that powers an electrical load, such as motor 78 of FIG. 1. Although differing in appearance, it is envisioned that any of the features and options described above with reference to the battery pack 70 of FIG. 1 and the lithium-class battery 110 of FIG. 2 can be incorporated, singly or in any combination, into the electrochemical devices 210, 310, 410 and 510 of FIGS. 3-6, and vice versa. Some representative points of similarity include a protective and fluid-tight device housing 212 (also referred to as "battery housing"; shown only in FIG. 3, but similarly applicable to FIGS. 4-6) for storing therein an electrolyte 214 that is chemically configured to conduct ions. Also packaged inside the device housing 212, in electrochemical contact with the electrolyte 214, is an electrode stack composed of one or more (first) working electrodes 222 interleaved with and juxtaposed in face-to-face relation to one or more (second) working electrodes 224. While portrayed in FIGS. 3-6 with a single pair of working electrodes, each electrochemical device may include multiple electrode pairs (e.g., 10-20 or more) that are stacked and connected in parallel or series for storing and supplying electrical energy.

Inserted between the two neighboring electrodes 222, 224 is an electrode separator assembly 250 that is likewise disposed inside the device housing 212 in electrochemical contact with the electrolyte 214. For device configurations incorporating multiple mated pairs of opposite-polarity electrodes, a respective electrode separator assembly 250 may be sandwiched between one, some, or all mated pairs. In the illustrated example, the electrode separator assembly 250 of FIG. 3 is a multilayer sandwich structure with four distinct sections: (1) an upper or top (first) porous separator layer 256A; (2) a distinct current collector (CC) layer 252; (3) a combined reference electrode (RE) 254 and thermal barrier (TB) 258 layer; and (3) a subjacent or bottom (second) porous separator layer 256B. For at least some device architectures, the electrode separator assembly 250 consists essentially of the four illustrated layers. In the same vein, each of the separator assemblies 350, 450, 550 depicted in FIGS. 4-6 may consist essentially of their respective RE, TB, CC, and separator layers. It is also within the scope of this disclosure that these functional separator assemblies incorporate additional or alternative layers, including those that do and those that do not materially change the functionality of the assembly.

Similar to the porous separator 126 of FIG. 2, the separator layers 256A-B, 356A-B, 456, 556A-B of FIGS. 3-6 are electrically insulative, in that they prevent short-circuiting contact between the two electrodes 222, 224, yet are ionically transmissive, in that they allow for the back-and-forth transfer of ions between the two working electrodes 222, 224. To this end, the separator layers 256A-B, 356A-B, 456, 556A-B may include any of the options and alternatives described above with reference to the separator 126. For instance, each separator layer 256A-B, 356A-B, 456, 556A-B may be fabricated, in whole or in part, from an electrically insulating material, such as polypropylene (PP), polyethylene (PE), polyvinylidene fluoride (PVDF) nanofiber web, polytetrafluoroethylene (PTFE), modified polytriphenylamine (PTPAn), cellulose-based composites, or other functionally suitable electrical insulators. These separator layers 256A-B, 356A-B, 456, 556A-B may be microporous or nanoporous polymeric structures, e.g., with an average pore diameter/width of about 20 nm to about 2 microns. Each separator layer 256A-B, 356A-B, 456, 556A-B may have a substantially uniform thickness, measured in a direction parallel to the stacking direction (e.g., vertically in FIGS. 3-6), of about 5 μm to about 60 μm or, in at least some implementations, approximately 10-25 μm.

In order to transmit electrical signals from the in-stack electrical conductors of the functional separator assemblies 250, 350, 450, 550, e.g., to a voltmeter, sensor PCBA, microprocessor, or control unit, an electrically conductive current collector layer 252, 352, 452, 552 is located on or entrained with the active material particles of the RE layers 254, 354, 454, 554. Each CC layer 252, 352, 452, 552 may be fabricated, in whole or in part, from an electrical conductor that allows for the bidirectional flow of electricity with minimal resistance. Some non-limiting examples of conductive materials include, but are certainly not limited to, aluminum (Al), silver (Ag), copper (C), gold (Au), steel (e.g., type 304 and type 316 stainless steel), nickel (Ni), graphene, carbon foil, etc. In at least some embodiments, the CC layer 252, 352, 452, 552 may be applied onto a major face of the separator layer or across the RE and/or TB layers by sputter coating. In addition, each CC layer 252, 352, 452, 552 may have a substantially uniform thickness, measured in a direction parallel to the stacking direction, of about 10 nm to about 750 nm or, in at least some implementations, approximately 50-500 nm.

To provision in situ monitoring of one or both adjoining electrodes 222, 224 during operation of the electrochemical devices 210, 310, 410, 510, each functional separator assembly 250, 350, 450, 550 incorporates therein a reference electrode layer 254, 354, 454, 554. The RE layer 254, 354, 454, 554 may enable real-time or near real-time measurement of individual positive and negative electrode potentials as the cell is being cycled. Each RE layer 254, 354, 454, 554 may be formed, in whole or in part, from an electrochemically active electrode material, e.g., that exhibits excellent cycle stability and high energy and power density. By way of non-limiting example, the RE layer 254, 354, 454, 554 may include a lithium-transition metal compound, such as lithium iron phosphate ($LiFePO_4$), a carbon-based lithium compound, such as lithium titanate $Li_{4+x}Ti_5O_{12}$, where $0 \leq x \leq 3$, such as $Li_4Ti_5O_{12}$ (LTO), or other suitable electroactive material. The RE layer may have a substantially uniform thickness, measured in a direction parallel to the stacking direction, of about 5 microns or less or, in at least some implementations, approximately 100 nm-1 micron.

To help stabilize the thermal and mechanical characteristics of the electrode stack during operation of the electrochemical devices 210, 310, 410, 510, each functional separator assembly 250, 350, 450, 550 also incorporates therein a thermal barrier layer 258, 358, 458, 558. The TB layers 258, 358, 458, 558 may function to thermally dissipate heat from the stack and thereby reduce hot spots on the separator layer; this, in turn, helps to preclude melting and any concomitant loss of porosity of the separator layer. Each TB layer 258, 358, 458, 558 may be formed, in whole or in part, from thermally insulating material that minimizes conductive heat transfer. By way of example, and not limitation, the TB layer 258, 358, 458, 558 may include aluminum oxide ($Al_2O_3$), silicon dioxide ($SiO_2$), lithiated zeolite, aluminosilicate, or other suitable insulative material. The TB layer may have a substantially uniform thickness, measured in a direction parallel to the stacking direction, of about 3 microns or less or, in at least some implementations, approximately 500 nm-1 micron. While shown with a single separator layer, a single RE layer, a single TB layer (or single combined RE/TB layer), and a single CC layer (or single combined RE/CC layer), the illustrated functional separators may include any combination of one or more of the herein described layers.

The electrode separator assembly 250 of FIG. 3 may be considered a single-sided design in which the CC layer 252 and the combined RE/TB layer 254, 258 are all mounted onto one shared face of the subjacent separator layer 256B. In this instance, the two separator layers 256A and 256B are portrayed as the outermost layers of the electrode separator assembly 250, generally coterminous with and encasing therebetween the CC layer 252 and the intermixed RE and TB layer 254, 258. The top separator layer 256A is sandwiched between and directly physically contacts both the first working electrode 222 and the CC layer 252. In the same vein, the subjacent separator layer 256B is sandwiched between and directly physically contacts both the second working electrode 224 and the combined RE/TB layer 254, 258. To achieve this particular design, the RE layer's active electrode material particles are blended together with the TB layer's insulating material particles and coated onto the porous separator substrate in the same layer. As used herein, the term "layer" is inclusive of but does not per se require that a particular segment of the composite construction be a continuous sheet or otherwise span the entirety of all remaining layers.

For a double-sided design, the electrode separator assembly 350 of FIG. 4 is portrayed with the CC layer 352 and RE layer 354 mounted onto a first (top) face of a bottom (second) separator layer 356B, whereas the TB layer 358 is mounted onto a second (bottom) face of the separator layer 356B opposite that of the CC and RE layers 352, 354. In this example, a top (first) separator layer 356A and the TB layer 358 are portrayed as the outermost layers of the electrode separator assembly 350, generally coterminous with and encasing therebetween the intermixed CC/RE layer 352, 354 and the separator layer 356B. The top separator layer 356A is sandwiched between and directly physically contacts both the first working electrode 222 and the CC/RE layer 352, 354. In the same vein, the TB layer 358 is sandwiched between and directly physically contacts both the second working electrode 224 and the bottom separator layer 356B. To achieve this particular design, the RE layer's active electrode material particles are blended together with the CC layer's electrically conductive material and coated onto the porous separator substrate in the same layer. It is also envisioned that the CC layer 352 may be coated onto the RE layer 354 (similar to CC layer 252 of FIG. 3), and the CC layer 252 may be intermixed with the combined RE/TB layer 254, 258 (similar to CC layer 352 of FIG. 4).

Figure 5:
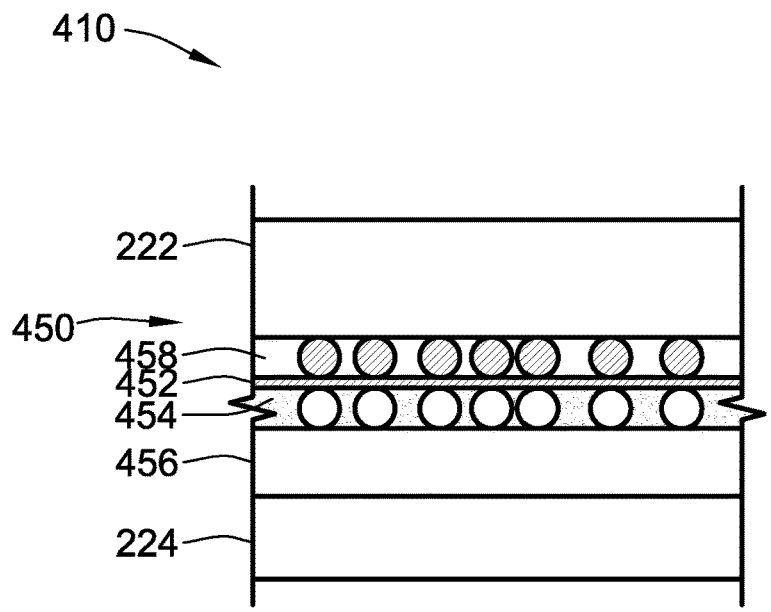
FIG. 5 is a schematic illustration of yet another representative battery electrode stack with a multilayer electrode separator assembly having a thermal barrier layer stacked on a reference electrode layer in accord with aspects of the disclosed concepts.

Turning next to FIG. 5, there is shown another example of a single-sided, multilayer functional electrode separator; however, in this instance, each segment is applied as a distinct layer to form a four-layer stackup. In particular, the separator layer 456 and the TB layer 458 are portrayed as the outermost layers of the electrode separator assembly 450, generally coterminous with and encasing therebetween the RE layer 454 and the CC layer 452. The TB layer 458 is sandwiched between and directly physically contacts both the first working electrode 222 and the CC layer 452. In the same vein, the separator layer 456 is sandwiched between and directly physically contacts both the second working electrode 224 and the RE layer 454, whereas the CC layer is sandwiched between and directly physically contacts both the TB layer 458 and the RE layer 454. In some configurations, the CC 452 layer may be sandwiched between and directly physically contacts both the RE layer 454 and the separator layer 456 while the TB layer 458 directly physically contacts the RE layer 454. FIG. 5 also illustrates the TB layer 458 with a notably larger thickness than that of the RE layer 454.

Figure 6:
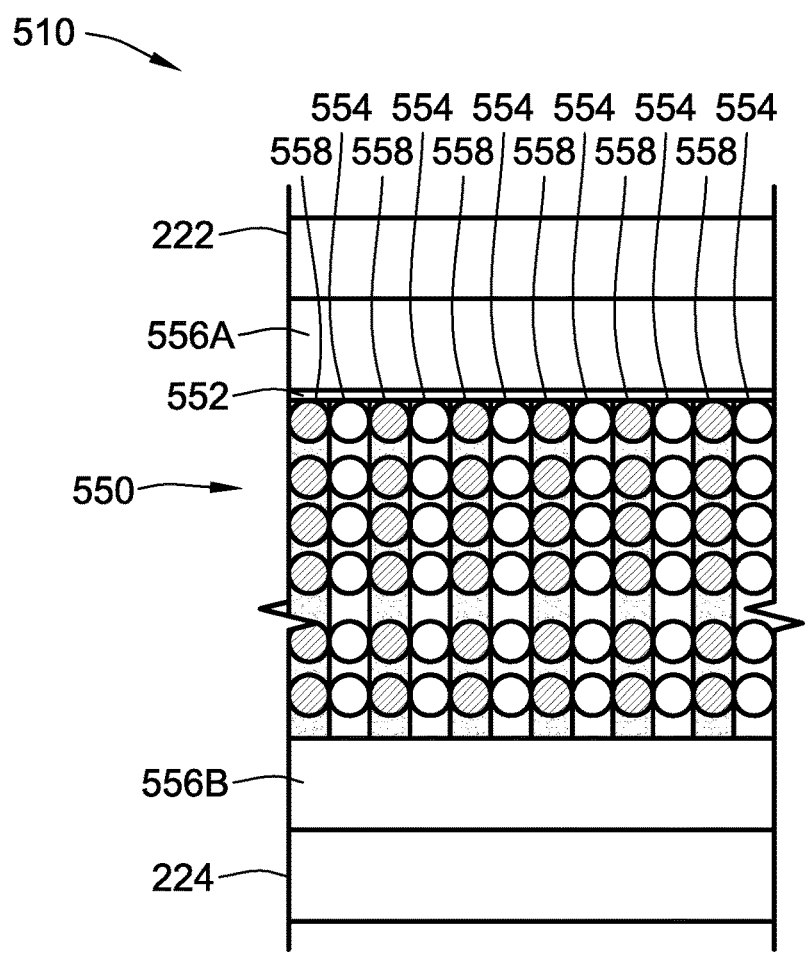
FIG. 6 is a schematic illustration of another representative battery electrode stack with a patterned electrode separator assembly having a reference electrode layer interspersed with a thermal barrier layer in accord with aspects of the disclosed concepts.

FIG. 6 presents a representative electrochemical device 510 with a single-sided, patterned electrode separator assembly 550 in which the RE layer 554 is interspersed (but not intermixed) with the TB layer 558. That is, the RE and TB layers 554, 558 are each applied directly onto a bottom (second) separator substrate layer 556B in a predefined pattern with each layer 554, 558 isolated to one or more select regions on the separator layer 556. In this example, a top (first) substrate layer 556A and the bottom substrate layer 556B are portrayed as the outermost layers of the electrode separator assembly 550, encasing therebetween the CC layer 552 and the interspersed RE and TB layers 554, 558. The top separator layer 256A is sandwiched between and directly physically contacts both the first working electrode 222 and the CC layer 552. In the same vein, the bottom separator layer 556B is sandwiched between and directly physically contacts both the second working electrode 224 and the RE and TB layers 554, 558. In some configurations, the CC layer 452 may be sandwiched between and directly physically contacts both the interspersed RE and TB layers 554, 558 and the separator layer 556 while the other side of the interspersed RE and TB layers 554, 558 directly physically contacts the separator.

All layers of the electrode separator assemblies 250, 350, 450, 550 may be sufficiently porous and permeable to transmit therethrough the ions of the electrolyte 214. As described above, each layer is formed using a structurally porous material and/or using a manufacturing process designed to create an ionically transmissive structure. It is envisioned that the porosity of the separator layers may be substantially identical to or, alternatively, measurably distinct from the porosities of the RE, TB and CC layers. By way of example, and not limitation, the respective porosity of each layer in the electrode separator assemblies 250, 350, 450, 550 may have a void fraction (i.e., void volume to total volume) of about 30% to about 80% or, in at least some applications, a porosity of about 40% to about 65%. In some configurations, the RE layer and/or TB layer may be scattered particles that attach onto the separator surface, partially filling some of the pores of separator; in this case, the RE and TB particles may cover about 20% to about 100% of the separator's non-void fraction surface. For some configurations, the RE and/or TB materials may have a higher surface density such that there is contact between the particles; in this case, the porosity of the RE and/or TB layers may be about 30-80%.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. An electrochemical device, comprising:
   a device housing;
   an electrolyte located inside the device housing and configured to conduct ions;
   an electrode stack located inside the device housing and including first and second working electrodes in electrochemical contact with the electrolyte; and
   an electrode separator assembly located inside the device housing and interposed between the first and second working electrodes, the electrode separator assembly including:
      first and second separator layers each including an electrically insulating material and having a porous structure that transmits therethrough the ions of the electrolyte;
      a current collector (CC) layer attached to the first and second separator layers and including an electrically conductive material, wherein the CC layer is located between the first and second separator layers and thereby isolated from the first and second working electrodes;
      a reference electrode (RE) layer attached to the first and second separator layers, abutting the CC layer, and including an active electrode material, wherein the RE layer is located between the first and second separator layers and thereby isolated from the first and second working electrodes; and
      a thermal barrier (TB) layer intermixed with the RE layer, located between the first and second separator layers, and including a thermally insulating material, the intermixed TB and RE layers forming a combined TB/RE layer sandwiched between and mounted directly to the CC layer and the second separator layer.

2. The electrochemical device of claim 1, wherein the CC layer, the RE layer, and the TB layer have porous structures that transmit therethrough the ions of the electrolyte.

3. The electrochemical device of claim 2, wherein the first and second separator layers, the CC layer, the RE layer, and the TB layer each has a respective porosity distinct from the respective porosities of other ones of the layers.

4. The electrochemical device of claim 2, wherein the first and second separator layers, the CC layer, the RE layer, and the TB layer are each microporous and have a porosity with a void fraction of about 30% to about 80%.

5. The electrochemical device of claim 1, wherein the electrically insulating material of the first and second separator layers includes polypropylene, polyethylene, polyvinylidene fluoride, polytetrafluoroethylene, polytriphenylamine, polyimide, polyacrylonitrile, and/or cellulose composite.

6. The electrochemical device of claim 5, wherein the first and second separator layers each has a thickness of about 5 micrometers (μm) to about 60 μm.

7. The electrochemical device of claim 1, wherein the electrically conductive material of the CC layer includes copper, silver, nickel, stainless steel, aluminum, graphene, gold, carbon, and/or alloys or composites thereof.

8. The electrochemical device of claim 7, wherein the CC layer has a thickness of about 50 nanometers (nm) to about 500 nm.

9. The electrochemical device of claim 1, wherein the active electrode material of the RE layer includes lithium, lithium alloys, lithium iron phosphate (LiFePO$_4$), and/or lithium titanate (LTO).

10. The electrochemical device of claim 9, wherein the combined TB/RE layer has a thickness of about 1 micron or less.

11. The electrochemical device of claim 1, wherein the thermally insulating material of the TB layer includes zirconium oxide, aluminum oxide (Al$_2$O$_3$), silicon dioxide (SiO$_2$), lithiated zeolite, aluminosilicate, inorganic solid electrolyte materials, garnet ceramics, LISICON-type oxides, NASICON-type oxides, perovskite-type ceramics, and/or sulfide-based glass ceramics.

12. The electrochemical device of claim 11, wherein the combined TB/RE layer has a thickness of about 3 microns or less.

13. The electrochemical device of claim 1, wherein the electrode separator assembly consists essentially of the first and second separator layers, the CC layer, the RE layer, and the TB layer.

14. The electrochemical device of claim 1, wherein the CC layer adjoins and physically contacts the first separator layer, the RE layer and the TB layer adjoin and physically contact the second separator layer, and the CC layer adjoins and physically contacts the RE layer and the TB layer.

15. A motor vehicle, comprising:
    a vehicle body;
    a plurality of road wheels attached to the vehicle body;
    a traction motor attached to the vehicle body and operable to drive one or more of the road wheels to thereby propel the motor vehicle; and
    a traction battery pack attached to the vehicle body and operable to power the traction motor, the traction battery pack containing a plurality of lithium-class battery cells, each of the lithium-class battery cells including:
       a battery housing;
       an electrolyte located inside the battery housing and configured to conduct ions;

an electrode stack located inside the battery housing in electrochemical contact with the electrolyte, the electrode stack including a first working electrode in spaced facing relation with a second working electrode; and an electrode separator assembly located inside the battery housing and interposed between the first and second working electrodes, the electrode separator assembly including:

first and second separator layers attached in spaced facing relation to each other, the first and second separator layers each including an electrically insulating material and having a porous structure that transmits therethrough the ions of the electrolyte;

a current collector (CC) layer mounted directly to the first separator layer and including an electrically conductive material, wherein the CC layer is located between the first and second separator layers and thereby isolated from the first and second working electrodes;

a reference electrode (RE) layer mounted directly to the second separator layer, abutting the CC layer, and including an active electrode material, wherein the RE layer is located between the first and second separator layers and thereby isolated from the first and second working electrodes; and a thermal barrier (TB) layer intermixed with the RE layer, located between the first and second separator layers, and formed from a thermally insulating material, the intermixed TB and RE layers forming a combined TB/RE layer sandwiched between and mounted directly to the CC layer and the second separator layer.

16. A method of assembling an electrochemical device, the method comprising:

receiving a device housing of the electrochemical device;

locating an electrolyte inside the device housing, the electrolyte being configured to conduct ions;

locating an electrode stack inside the device housing in electrochemical contact with the electrolyte, the electrode stack including first and second working electrodes;

locating an electrode separator assembly inside the device housing and between the first and second working electrodes, the electrode separator assembly including:

first and second separator layers each including an electrically insulating material and having a porous structure that transmits therethrough the ions of the electrolyte;

a current collector (CC) layer attached to the first and second separator layers and including an electrically conductive material, wherein the CC layer is located between the first and second separator layers and thereby isolated from the first and second working electrodes;

a reference electrode (RE) layer attached to the first and second separator layers, abutting the CC layer, and including an active electrode material, wherein the RE layer is located between the first and second separator layers and thereby isolated from the first and second working electrodes; and a thermal barrier (TB) layer intermixed with the RE layer, located between the first and second separator layers, and including a thermally insulating material, the intermixed TB and RE layers forming a combined TB/RE layer sandwiched between and mounted directly to the CC layer and the second separator layer.

17. The method of claim 16, wherein the CC layer, the RE layer, and the TB layer have porous structures that transmit therethrough the ions of the electrolyte.

18. The method of claim 16, wherein the electrically insulating material of the first and second separator layers includes polypropylene, polyethylene, polyvinylidene fluoride, polytetrafluoroethylene, polytriphenylamine, and/or cellulose composite, and wherein the separator layer has a thickness of about 5 micrometers (μm) to about 60 μm.

19. The method of claim 16, wherein the electrically conductive material of the CC layer includes copper, silver, nickel, stainless steel, aluminum, graphene, gold, and/or carbon foil, and wherein the CC layer has a thickness of about 50 nanometers (nm) to about 500 nm.

20. The method of claim 16, wherein the active electrode material of the RE layer includes lithium, lithium alloys, lithium iron phosphate ($LiFePO_4$), and/or lithium titanate (LTO), and wherein the RE layer has a thickness of about 1 micron or less.

* * * * *